Oct. 18, 1932.  L. A. VASSAKOS  1,883,164
COUPLING
Filed Feb. 24, 1931
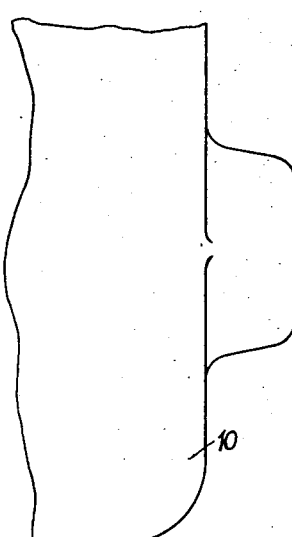
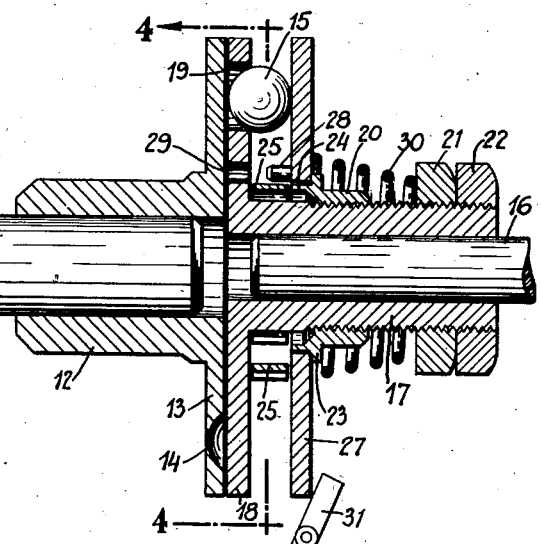
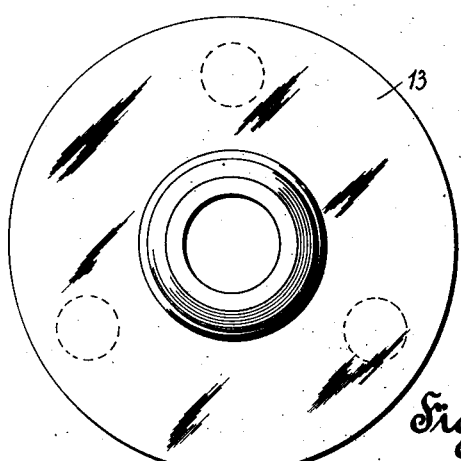
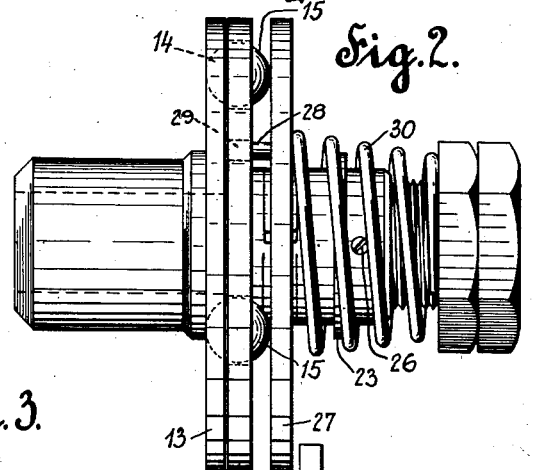
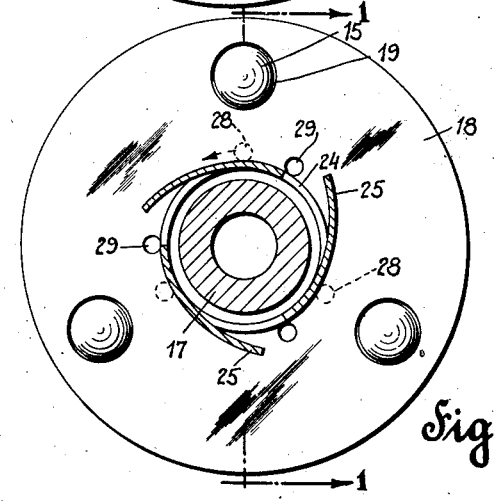
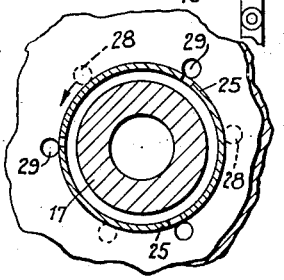
INVENTOR.
Leonidas A. Vassakos.
BY
ATTORNEY.

Patented Oct. 18, 1932

1,883,164

UNITED STATES PATENT OFFICE

LEONIDAS A. VASSAKOS, OF NEW YORK, N. Y.

COUPLING

Application filed February 24, 1931. Serial No. 517,891.

This invention relates to power transmission devices in general, and particularly to coupling and clutch means of the kind which will automatically open upon the application of an overload of power.

One of the objects of this invention is to provide a simple, inexpensive, but highly efficacious device of this kind, which will lend itself as coupling or clutch for any sort of power transmission, where safety for either human life or machinery, or both is one of the requirements, and which is so designed that it will automatically separate the power end from the driven element when the latter becomes overloaded beyond a certain predetermined maximum power requirement, and which will, if desired, cut out the power supply at such overload, the device including means for automatically entering between and holding the separated device members apart, which means may be returned to its initial position to again restore the driving relation of these members.

Another object of my invention is to provide a device of this kind, where one or more balls are employed as power transmitting media.

Another object of my invention is to provide a coupling or clutch device in which the transmission member consists of one or more balls held permanently in operable position relative to the remainder of the device, by a ball engaging member, by means of which the balls are prevented from undesirable rolling and disengagement.

Another object of my invention is to provide in connection with such device, resilient spacing means for maintaining its parts in inoperative or disengaged position until engagement of the parts is desired.

The foregoing and still further objects of my invention will become more evident from the following description and the accompanying drawing, forming part of my disclosure, but by no means intended to limit same to the actual showing, and in which:

Fig. 1 is a vertical cross sectional view through my device in one of its preferred embodiments, and showing it in open or inactive position.

Fig. 2 illustrates an elevation of the device in power transmitting position.

Fig. 3 is an end view of the device.

Fig. 4 is a partial cross-sectional view of the device, taken on lines 4—4 of Fig. 1.

Fig. 5 is a fragmental cross sectional view taken on lines 5—5 of Fig. 2.

Referring now to the figures, numeral 10 denotes a power source from which extends a spindle or shaft 11. Secured to the latter is the driving member 12 which consists of a disc 13 provided with a plurality of spherical depressions 14, adapted to receive portions of power transmitting balls 15.

In alignment with shaft 11 is the driven spindle 16 to which is keyed or otherwise fastened the driven member 17 of the device. This member consists of a disc 18 provided with apertures 19, through which the balls 15 are freely slidable and adapted to accommodate balls 15, when the latter are not in engagement with depressions 14 of disc 13, and to grip them solidly, as seen in Fig. 2, when the balls are in power transmitting position and in engagement with depressions 14.

The long sleeve of driven member 17 engaging spindle 16 is preferably threaded at its outer surface for accommodating an internally threaded bushing 20, adjusting nut 21 and lock nut 22. Bushing 20 is provided with a collar 23, and a reduced tubular extension 24 terminating in spring leaves 25, which have the tendency of spreading, as illustrated in Fig. 4. Bushing 20 is held against nut threading from the sleeve by means of set screw 26 or other suitable arrangement.

In running fit engagement with reduced extension 24 is a thrust ring 27 for which collar 23 of bushing 20 serves as stop. Extending from the inner face of ring 27 are pins 28 designed for depressing spring leaves 25 when the ring is turned in the direction indicated by arrow I in Fig. 5. Disc 18 of the driven member is provided with apertures 29 for accommodating pins 28 when thrust ring 27 is in position shown in Fig. 2.

Between adjusting nut 21 and ring 27, is an expansion spring 30 adapted to bear against the ring, which latter presses against the balls 15. The tension of the spring is adjustable and may be regulated to any desired degree by means of setting the nuts relative to the threaded sleeve of driven member 17.

Leaf springs 25 serve, when spread, as spacers or separators between disc 18 and ring 27 when the balls are forced by overload out of engagement with sockets or depressions 14 of driving disc 13. The springs also prevent ring 27 from exerting pressure against the balls while the driven member is overloaded.

In operative relation with ring 27 is a lever 31 of an electric switch (not shown) or any other control means governing the operation of the power source and connected with and actuating driving member 12. When both members 12 and 17 are in operative engagement with one another, ring 27 clears switch or valve lever 31 which is then in its "on" position, shown in Fig. 2; but the moment an overload of power causes the disengagement of these members, ring 27 is forced out and pushes lever 31 to its "off" position, shown in Fig. 1, thereby stopping power source 10.

The device constitutes an automatically disengageable coupling or clutch, and as such, forms a connection between a driving source and a driven device, be it a shaft or a machine, a spindle of a grinder power transmission shafting or any other desired mechanism, which is designated to perform a certain amount of work, and which, when unduly overstrained would cause damage of some sort, and may endanger not only the work for which the mechanism is intended, but may also injure the operatives attending the machine, and even destroy human life.

When the driving member is coupled with the driven element as shown in Fig. 2, balls 15 are seated in sockets or depressions 14 of the driver disc 13, and are engaged at their vertical center plan by the inner surfaces of apertures 19 of disc 18. Spring 30 presses ring 27 against balls 15 and maintains them under constant tension, thus preventing them from leaving sockets 14, thereby assuring a coupling or clutch connection between driving and driven members.

While the balls are seated in depression 14 ring 27 is closest to disc 18 and farthest from stop collar 23. At this position pins 28 of ring 27 register with pin apertures 29 of disc 18 and the inner periphery of the annular opening provided in ring 27 engages spring leaves 25 of bushing 20 and hold them depressed as shown in Fig. 5.

Assuming now that an obstruction in the work performed by driven spindle 16 causes an undue overload with the tendency of stopping the spindle. At that moment the driven member 17 comes to a stand still while disc 13 of the driver continues to rotate. The balls, being held in apertures 19 against further movement will be forced out of engagement with sockets 14, thereby causing ring 27 to move in the direction towards nuts 21 and 22 and to compress spring 30. In that position of ring 27, spacer leaf springs 25 are released in the manner seen in Fig. 4. They serve as ring arresters and prevent spring 30 from pushing back ring 27, which movement would cause the interconnection of driving and driven members through balls 15.

In order to render the device operative, it is required that ring 27 be turned in the direction indicated by arrow I, so that pins 28 depress leaves 25 into a circular position at which they are then held by the openings of ring 27. The latter is forced over the depressed leaves by spring 30, which holds them in inactive position until the ring is forced out again by the balls.

The apertures 19 of disc 18 serve not only to engage the balls, but prevents the latter from rotating between disc 13 and ring 27 when the device is in operative position shown in Fig. 2.

The device described is capable of many modifications, as it is being adapted to various uses. Thus it may be employed as either a coupling or a clutch, it may be provided with any number of power transmitting sockets and balls or slidable plungers; it may be equipped instead of with one expansion spring, with individual springs for each ball or plunger employed, yet the main features of my device and particularly the disposition of the balls or plungers relative to the respective driving and driven members, and the manner of their engagement by the latter will always form the basic principle for correct construction and dependable workability of the device. I therefore reserve for myself the right to make changes and improvements in my invention within the broad scope thereof, as set forth in the annexed claims.

I claim:

1. A device of the character described, comprising driving and driven members in axial alignment with but physically separated from one another, a plurality of individual and independently operable elements normally in engagement with and forming interconnections between said members, pressure induced means operatively connected with and forming a part of said driven element and adapted to normally bear with yieldable pressure against the said elements for retaining them in their interconnecting relation to said members under normal load, a resilient spacing member forming a part of said driven member and adapted to be normally held inoperative by said means (in normal position) said elements adapted to be disengaged from said driving member on overload, thereby forcing said means in the direction from the driving element, said spacing member adapted to be released by said means when the latter is forced out by said elements into interconnecting position between driving and driven members, said means provided with spacing members to release said pressure induced means, so that the latter may again bear against said individual elements, while at the same time rendering said spacer member inactive.

2. A device of the character described, comprising driving and driven members in axial alignment with, but separated from one another, said driving member provided with sockets or depressions, said driven member provided with apertures, a plurality of balls normally engaged by the latter and seated in said depressions, a ring member operatively mounted with and forming a part of said driven member, an adjustable spring bearing against said ring member, the latter bearing against said balls and thereby maintaining them in engagement with said depressions and apertures under normal load, a resilient spacing and ring holding member connected with and forming part of the driven member, and normally held in inactive position by said ring member under normal load, said balls adapted to disengage from said driving member when the driven member becomes overloaded, thereby pushing the ring member in the direction from the driving member, whereby said ring holding member is released by and prevents the ring member from exerting pressure against said balls, said ring member provided with means for rendering said ring holding member inoperative, prior to being held thus by the ring member under normal load condition.

3. In a device for the purpose described, a driving member including a disc having spherical depressions, a driven member including a disc having apertures, a ring operatively mounted thereon, spring means bearing against the ring, spring adjusting means associated with the driven member, an expandible ring arrester also secured to the latter and adapted to be normally held inoperative by said ring, and to be released therefrom on overload, said ring provided with arrester-folding means adapted to cause said arrester to assume its inoperative position prior to being thus held by the ring, a plurality of balls held in the apertures of the driven disc and adapted to normally engage the depressions of the driving disc and to be thus held in engagement by said ring under normal load conditions.

4. In a device for the purpose described comprising driving and driven members in axial alignment with both separate from each other, the driving member including a disc having spherical depressions, a driven member including a disc having apertures, a ring operatively mounted thereon, spring means bearing against the ring, spring adjusting means associated with the driven member, an expandible ring arrester also secured to the latter and adapted to be normally held inoperative by said ring, and to be released therefrom on overload, said ring provided with arrester-folding means adapted to cause said arrester to assume its inoperative position prior to being thus held by the ring, a plurality of balls held in the apertures of the driven disc and adapted to normally engage the depressions of the driving disc and to be thus held in engagement by said ring under normal load conditions.

5. In a device for the purpose described, a driving member including a disc having spherical depressions, a driven member including a disc having apertures, a ring operatively mounted thereon, spring means bearing against the ring, spring adjusting means associated with the driven member, an expandible ring arrester also secured to the latter and adapted to be normally held inoperative by said ring, and to be released therefrom on overload, said ring provided with arrester-folding means adapted to cause said arrester to assume its inoperative position prior to being thus held by the ring, a plurality of balls held in the apertures of the driven disc and adapted to normally engage the depressions of the driving disc and to be thus held in engagement by said ring under normal load conditions, and means associated with the driven member to cut off supply of power from the driving means upon said elements being disengaged from the driving motor.

Signed at New York, in the county and State of New York, this 18 day of February, 1931.

LEONIDAS A. VASSAKOS.